March 31, 1931. O. C. NOBLE 1,798,217
METHOD OF AND APPARATUS FOR FORMING GLASS ARTICLES
Filed Sept. 14, 1927
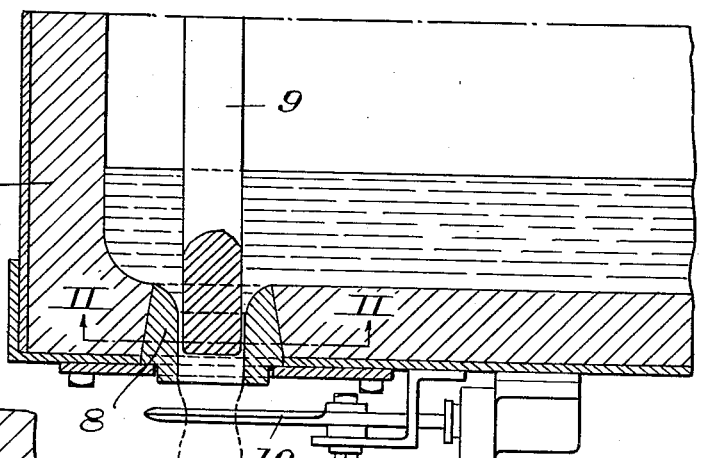
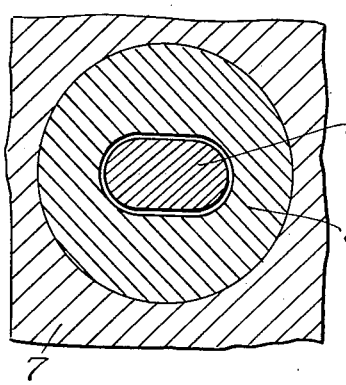
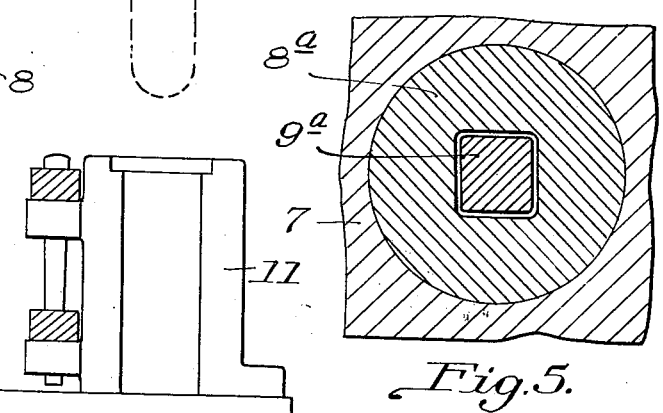
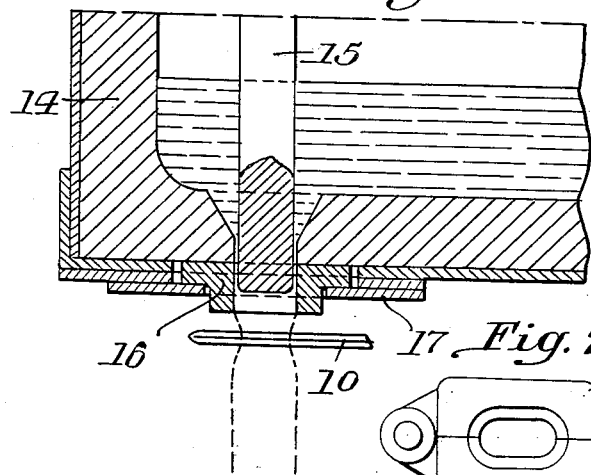
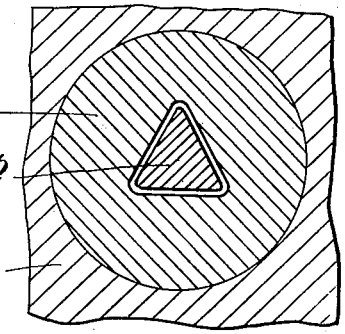
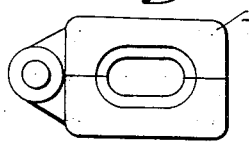
INVENTOR
Olbert C. Noble
By Archworth Martin
Attorney

Patented Mar. 31, 1931

1,798,217

UNITED STATES PATENT OFFICE

OLBERT C. NOBLE, OF WASHINGTON, PENNSYLVANIA, ASSIGNOR TO TYGART VALLEY GLASS COMPANY, OF WASHINGTON, PENNSYLVANIA, A CORPORATION OF WEST VIRGINIA

METHOD OF AND APPARATUS FOR FORMING GLASS ARTICLES

Application filed September 14, 1927. Serial No. 219,431.

My invention relates to a method of and apparatus for forming glass articles, and particularly to the formation of glass articles in press molds, blow molds, and the like.

In the formation of glass articles by pressing and blowing operations, it has been common practice to supply the charges of molten glass, sometimes designated as "gobs", through an orifice in the bottom of a forehearth or the like, to pressing and blowing mechanism, the charges so supplied being each formed into an article of glassware. The orifices are commonly of circular form and the charges of glass are therefore also circular in cross section. The molds, and consequently the articles formed therein are of various cross-sectional forms, such as circular, oblong, rectangular, triangular, etc.

In the older methods referred to, no attempt has been made to change the cross sectional form of the charges, with changes in the forms of the molds employed. In making an article, such as an ammonia bottle, that is oblong in cross section, the employment of circular charges results in the glass being first blown into contact with those walls of the mold which define the shortest diameter, with the result that those portions of the plastic glass which first engage the side walls of the mold have not been properly stretched or expanded before they become chilled, and the other portions of the glass charges must be expanded against the other wall portions of the mold by further blowing which stretches the remaining portion of the glass until the entire mold cavity is lined with glass, with the result that the walls of the glass article are of uneven thickness and in some cases parts thereof have a roughened or "washboard" appearance. Furthermore, there is a difference in molecular strains as between various portions of the glass article, so that it does not have as great strength as if approximately all portions of the wall were formed simultaneously. The same principle applies to articles formed in molds that are angular in cross section, since the angles of the mold will not be filled by the glass until intermediate portions of the glass articles have become partially set.

My invention has for its object the provision of a means and a method whereby various objections incident to the formation of glass articles by the older methods are overcome, and, broadly stated, comprises the formation of mold charges of glass with a cross sectional or other contour similar to that of the corresponding contour of the article to be formed therefrom.

Some of the ways in which my invention may be practised are shown in the accompanying drawing, wherein Fig. 1 is a sectional elevational view, of a portion of a forehearth and a mold table; Fig. 2 is a view taken on the line II—II of Fig. 1; Fig. 3 is a cross sectional view of the plunger of Figs. 1 and 2; Figs. 4 and 5 are views similar to Fig. 2, but showing orifices and plungers of other forms; Fig. 6 is a view showing a modification of the flow ring structure of Fig. 1, and Fig. 7 is a plan view of a mold for use in connection with the flow ring of Fig. 2 on a reduced scale.

Referring to Figs. 1, 2 and 3, I show a forehearth 7 containing the usual supply of molten glass, and provided with a flow ring or orifice member 8 and a vertically-reciprocable plunger 9 for controlling flow of molten glass through the flow ring. Shears 10 are provided for cutting charges from the molten glass which flows through the orifice 8. These charges of glass are formed to articles of a desired shape in press molds or blow molds, or by a combined pressing and blowing operation, one of such molds being indicated by the numeral 11 as mounted upon a fragmentary portion of a table 12. The parts thus far described, with the exception of the plunger 9 and the flow ring 8, may be of any well-known form and operable in a manner familiar in the art.

In case the article to be formed is oval in cross section, such as a whisky flask, a "French oval", or an ammonia bottle, I will provide an opening of oval form in the flow ring 8, as shown in Fig. 2, and the plunger 9 will correspond in cross sectional contour to the contour of the opening, so that the charge of glass severed by the shear 10 will have approximately the contour of the mold cavity and will therefore be uniformly stretched or expanded throughout all of its parts when blown or pressed in a mold 13 (Fig. 7) whose cavity is oval in cross section, since it will engage all portions of the mold side wall at substantially the same instant.

In Fig. 4, I have shown a flow ring 8ª which is provided with an opening that is approximately square, the plunger 9ª having a similar cross sectional contour. In Fig. 5, the opening in the flow ring 8ᵇ is of triangular form, with the plunger 9ᵇ complemental thereto in shape.

Referring to Fig. 6, I show a forehearth 14 that is provided with an orifice of circular form in its bottom wall, and a plunger 15 that is circular in cross section, for controlling flow through the orifice. Beneath the bottom wall of the forehearth 14, I mount a flow ring 16 that may have an opening of the contour of the openings in rings 8, 8ª or 8ᵇ, or of various other forms, the mold charge being given its desired cross sectional shape during its passage through the ring 16.

The flow ring 16 is held in place by a plate 17 that is detachable from the forehearth, to permit conveninent change from one form of flow ring to the other, the plunger being meanwhile lowered to obstruct flow through the opening in the bottom of the forehearth.

While I have herein dwelt more particularly upon the similarity of contour of the mold charges and the mold cavities respectively, I also propose to have the mold charges of such length that the molten glass, during the step of expanding the same in the mold, will contact with the bottom wall of the mold cavity at substantially the same instant that it is caused to engage the side walls thereof.

I claim as my invention:—

1. The combination with a glass-forming mold having a cavity that is of non-circular form, of means for supplying mold charges thereto, comprising a flow ring having a cross sectional form similar to the cross sectional form of the mold cavity, and a longitudinally reciprocable plunger co-operative with said flow ring to control the flow of glass therethrough, the cross sectional form of the said plunger corresponding to that of the orifice through the flow ring.

2. The step in forming glass articles in non-circular molds, which comprises expanding a mold charge into contact with substantially all portions of the side walls of the mold at approximately the same time.

3. The step in forming glass articles in non-circular molds, which comprises expanding a mold charge into contact with substantially all portions of the side and bottom walls of the mold at approximately the same time.

4. The step in forming glassware in a mold having a cavity whose cross sectional dimensions are of different lengths, which comprises shaping a mold charge having a diameter less than the shorter cross sectional dimension of the said cavity and a diameter of greater length than said dimension, and expanding said charge in the mold cavity.

5. The step in forming glassware in a mold cavity having substantially flat side walls, and edge walls spaced apart a greater distance than the side walls, which comprises introducing a mold charge into said cavity and expanding the same, the side surfaces of the charge being initially spaced apart a distance bearing such relation to the distance between the edge surfaces thereof as the shorter diameter of the mold cavity bears to the longer diameter thereof.

6. The method of forming glass articles, which comprises supplying charges of molten glass to molds of various cross-sectional forms, changing the cross-sectional forms of said charges in accordance with changes in the form of the molds, and expanding the charges within the molds.

In testimony whereof I, the said OLBERT C. NOBLE, have hereunto set my hand.

OLBERT C. NOBLE.